United States Patent
Bordawekar et al.

(10) Patent No.: US 10,217,053 B2
(45) Date of Patent: Feb. 26, 2019

(54) PROVISIONING SERVICE REQUESTS IN A COMPUTER SYSTEM

(71) Applicant: International Business Machines Corporation, Armonk, NY (US)

(72) Inventors: Rajesh Bordawekar, Yorktown Heights, NY (US); Ashish Kundu, Elmsford, NY (US); Oded Shmueli, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 14/747,062

(22) Filed: Jun. 23, 2015

(65) Prior Publication Data

US 2016/0379125 A1  Dec. 29, 2016

(51) Int. Cl.
| | |
|---|---|
| *G06N 5/04* | (2006.01) |
| *G06N 7/00* | (2006.01) |
| *G06N 99/00* | (2010.01) |
| *G06F 9/50* | (2006.01) |

(52) U.S. Cl.
CPC .......... *G06N 7/005* (2013.01); *G06F 9/5011* (2013.01); *G06N 99/005* (2013.01); *G06N 5/04* (2013.01)

(58) Field of Classification Search
USPC ..................................................... 706/12, 45
See application file for complete search history.

(56) References Cited

U.S. PATENT DOCUMENTS

| | | |
|---|---|---|
| 2012/0102183 A1 | 4/2012 | Murakami et al. |
| 2013/0166712 A1 | 6/2013 | Chandramouli et al. |
| 2015/0067171 A1 | 3/2015 | Yum et al. |

FOREIGN PATENT DOCUMENTS

| | | |
|---|---|---|
| CN | 103023980 | 4/2013 |
| CN | 103152389 | 6/2013 |
| CN | 104408070 | 11/2015 |

OTHER PUBLICATIONS

Brady, et al., Sandboxes for Model-Based Inquiry, J Sci Educ Technol, Jul. 13, 2014, v. 24, pp. 265-286.*

(Continued)

*Primary Examiner* — Wilbert L Starks
(74) *Attorney, Agent, or Firm* — Fleit Gibbons Gutman Bongini Bianco PL; Jon A. Gibbons

(57) ABSTRACT

Disclosed is a system, computer program product, and method for provisioning a new service request. The computer-implemented method begins with receiving a new service request for computational resources in a computing system. The required computational resources are memory usage, storage usage, processor usage, or a combination thereof to fulfill the new service request. Next a sandbox computing environment is used to operate the new service request. The sandbox computing environment is used to isolate the computing system. The sandbox computing environment produces a current computational resources usage data to fulfill the new service request in the sandbox computing environment. The current sandbox computational resources usage data and historical computational resources usage data are both used by a machine learning module to create a prediction of the computational resources that will be required in the computing system to fulfill the new service request.

20 Claims, 5 Drawing Sheets

(56) References Cited

OTHER PUBLICATIONS

Brady, et al., Sandboxes for Model-Based Inquiry, J Sci Educ Technol, Jul. 13, 2014, v. 24, pp. 265-286 (Year: 2014).*
Merino, L., et al., "Building safe PaaS clouds: A survey on security in multitenant software platforms," Computers & Security, Oct. 21, 2011, pp. 96-108, vol. 31.
Bouchenak, S., et al., "Verifying Cloud Services: Present and Future," ACM SIGOPS Operating Systems Review, Jul. 2013, pp. 1-14.
Blau, B., et al., "How to trade Electronic Services? Current Status and Open Questions," Jan. 2008, pp. 1-9.
Oracle, "Home / Enterprise Manager / Oracle Enterprise Manager Cloud Control Documentation, 12c Release 4 Enterprise Manager Cloud Control Administrator's Guide, 22.3.6 Sub Services," Downloaded on Jun. 15, 2015, pp. 1-5.
Cassar, G., et al., "Composition of Services in Pervasive Environments: A Divide and Conquer Approach," IEEE Symposium on Computers and Communications, Jul. 7-10, 2013, pp. 1-7.
Gupta, C., et al., "PQR: Predicting Query Execution Times for Autonomous Workload Management," International Conference on Autonomic Computing, Jun. 2-6, 2008, p. 1.
Matsunaga, A., et al., "On the use of machine learning to predict the time and resources consumed by applications," IEEE/ACM International Conference on Cluster, Cloud and Grid Computing, May 17-20, 2010, pp. 495-504.
Mohana, R., et al., "Study of Knowledge Based Admission Control for a Software-as-a-Service Provider in Cloud Computing Environments," Journal of Computer Applications, Dec. 2013, pp. 1-5, vol. 6, Issue 2.
He, Y., et al., "A Novel Admission Control Model in Cloud Computing," Jan. 28, 2014, pp. 1-14.
Dhok, J., et al., "Learning Based Opportunistic Admission Control Algorithm for MapReduce as a Service," Feb. 25-27, 2010, pp. 1-8.

\* cited by examiner

PROVISIONING SERVICE REQUESTS IN A COMPUTER SYSTEM

BACKGROUND

The present invention generally relates to cloud computing, and more specifically to managing the provisioning of new service request in computer systems, especially cloud-based systems.

In general, cloud computing refers to Internet-based computing where shared resources, software, and information are provided to users of computer systems and other electronic devices (e.g., mobile phones) on demand. Adoption of cloud computing has been aided by the widespread adoption of virtualization, which is the creation of a virtual (rather than actual) version of something, e.g., an operating system, a server, a storage device, network resources, etc. Cloud computing provides a consumption and delivery model for information technology (IT) services based on the Internet and involves over-the-Internet provisioning of dynamically scalable and usually virtualized resources.

Cloud computing is facilitated by ease-of-access to remote computing websites (via the Internet) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

Cloud services, and especially PAAS ones (platform as a service) are becoming commonplace. Some platforms offer free services, low-price services, and paid services. A mix of such services is also possible. This creates an environment that may be prone to attacks as well as unintentionally created overload. A key to managing such a complex environment is the ability to protect against misuse and abuse.

When operating a provisioning system on cloud shared resources, certain service requests may be problematic in terms of the resources they require. For example, a submitted analysis request to a graph analysis service may run for a long time or produce many results and slow down the system as a whole. Ideally, the resources needed for a service request are known when the request is submitted. For example, for a relational databases (RDBs) queried with SQL, one can obtain a total run-time estimate from the query optimizer. This may also be the case for other services that perform a sequence or collection of actions whose individual costs are known in advance. However, for many services, the duration and resources required may become apparent only as the service request is being fulfilled. This induces an element of uncertainty and may result in inefficient provisioning, especially when some requests are malicious or inadvertently turn out to be high resource consumers. Computer time is not the only resource of interest. Space for storing intermediate results is also an important parameter as are the number of processors required (in a multi-core or GPU-based systems). There may be other restrictions on the kind of utilized resources.

The problem of provisioning of cloud services is particularly challenging when computing resources are shared between many users of various organizations. In addition, not all of these users are paying for the service (for example, some may use promotions) and hence it is not always possible to limit their usage strictly via financial means.

Practically, there are a several reasons why this provisioning of cloud services is important:

Expected resource usage may dictate the amount of resources to be allocated to a task. This is especially important in a cloud-based environment where additional resources may be dynamically allocated to the task. This is especially important in a multi-processor environment in which running out of time may put the job at the back of the queue for a long period of time often waiting while waiting for a sufficient number of processors to become available.

Very long running service requests may be used to overload a system by maliciously denying service to others.

The cost to provision graph queries and many analytic tasks are difficult to predict. These costs include time, processor usage, memory space and expense.

Accordingly, a need exists to overcome the problems of provisioning service requests, such as cloud services requests, in a computing system as described above.

SUMMARY

Deploying a multi-tier web application (or any other application for that matter) to meet a certain performance goal with minimum virtual instance renting cost is often the goal of many Infrastructure-as-a-Service (IaaS) or Platform-as-a-Service (PaaS) users. However, this goal can be very difficult to achieve for several reasons. First, typical IaaS and PaaS environments offer a variety of virtual server instances with different performance capacities and rental rates. Such instances are often marked with a high level description of their hardware/software configuration (e.g. 1 or 2 virtual CPUs), which offers little information regarding their performance for a particular application.

Second, multi-tier web applications often leverage clusters at different tiers to offer features such as load balance, scalability, and fault tolerance. The configuration of clusters (e.g., the number of member nodes, how workloads are distributed among member nodes, etc.) has a direct impact on application performance. However, the relation between cluster configuration and performance is application-dependent, and often not clear to cloud users.

To meet a given performance goal, users often over-provision a multi-tier web application by renting high-end virtual server instances and employing large clusters. Over-provisioning introduces high instance renting cost, which can make cloud deployment a less desirable option compared with traditional deployment options. Unfortunately, manually experimenting with different provisioning plans is often impractical given the huge space of candidate provisioning plans.

The present invention provides a prediction-based provisioning planning. Prediction-based provisioning planning identifies the most cost-effective provisioning plan for a given performance goal by exploring the space of candidate plans with performance prediction. One or more mechanisms are provided that efficiently learn performance traits of applications, virtual machines, and clusters to build models to predict the performance for an arbitrary provisioning plan. Historical performance monitoring data and data collected from a small set of automatic experiments are utilized to build a composite performance prediction model. This composite performance prediction module takes as input application workloads, types of virtual server instances, and cluster configuration, and outputs predicted performance.

The present invention provides a solution through a novel architecture, a system and building blocks for realizing a well-protected and productive computing environment, such as a cloud-based environment, service provisioning system. The solution includes:
  a. Identification of problematic service requests using machine learning techniques and/or sandbox execution on a model.
  b. Pricing and allocation schemes especially designed for automatically handling problematic requests.
  c. Service request modification techniques:
     1. Modify the request into a cheaper, yet still useful, request or collection of sub-requests.
     2. Breaking the request into a collection of cheaper sub-requests whose complete execution fulfills the original request.
  d. Combination of the above methods.

The service provider offers estimates as a service based on sandbox testing and historical data. These data estimates are useful for the customer to make decisions as to whether and how to run a particular service request. The customer or requestor can authorize estimate.

Estimates are useful for the provider in order to run the service efficiently and handle possibly problematic requests. Using the present invention, a cloud provider can perform/offer incremental and/or approximating services. Moreover, the cloud provider can employ innovative pricing schemes to discourage problematic requests.

Specifically the present invention provides a system, a computer-program product, and computer implemented method to provision a new service request. The computer-implemented method begins with receiving a new service request for computational resources in a computing system. The required computational resources are memory usage, storage usage, processor usage, multi-core, GPU and other hardware usage or a combination thereof to fulfill the new service request. Next a sandbox computing environment is used to operate the new service request. The sandbox computing environment is used to isolate the computing system. The sandbox computing environment produces a current computational resources usage data to fulfill the new service request in the sandbox computing environment. The current computational resources usage data and historical computational resources usage data are both used by a machine learning module to create a prediction of the computational resources that will be required in the target computing system to fulfill the new service request.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
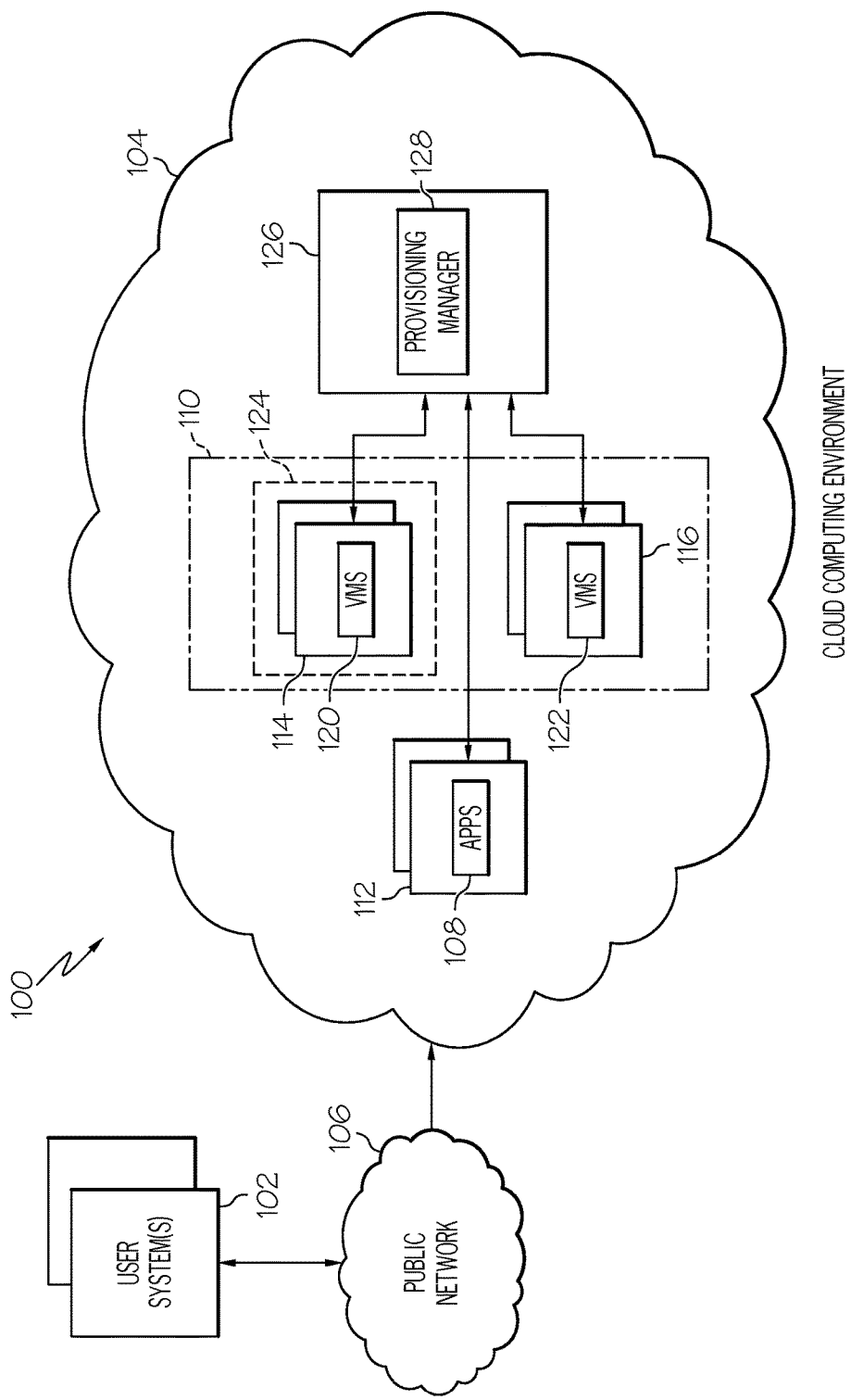
FIG. 1 is a block diagram illustrating one example of an operating environment.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, steps, operations, elements, components, and/or groups thereof.

The term "computational resources" is used to mean resources of a computing environment including number of processors, amount of memory, amount of disk space, all of various types and technologies, which typically dictates that amount of computational time required to provision service requests.

The term "computing environment" is used to mean a computing environment where applications, platforms, and infrastructure can be shared across many different users. One example of a computing environment is a cloud computing environment including private, public, and hybrid clouds. Service models for the computing environment include Infrastructure as a Service (IaaS), Platform as a Service (PaaS), and Software as a Service (SaaS).

The term "machine learning" is set of algorithms used for pattern recognition and to make predictions. The pattern recognition can be supervised where the mapping of inputs to outputs are taught. Also the pattern recognition can be unsupervised where the mappings of inputs to outputs are discovered. There are many approaches to machine learning including neural networks, associate rule learning, Bayesian networks, genetic algorithms and others.

The term "sandbox" is a computer system where the resources are controlled. Network access and access to the host system are typically heavily restricted. A sandbox is used to execute untested code, or untrusted programs from unverified or untrusted user.

The "service request" is a request to use one or more computational resources of a computing environment. A service request includes a query service request.

Operating Environment

FIG. 1 shows one example of an operating environment 100 for provisioning resources in a cloud computing environment for multi-tier cloud applications. It should be noted that although the following discussion is directed to a cloud computing environment various embodiment are not limited to such environment and are application to non-cloud computing environments as well. In particular, FIG. 1 shows one or more client/user systems 102 communicatively coupled to one or more cloud computing environments 104 via a public network 106 such as the Internet. The user systems 102 can include, for example, information processing systems such as desktop computers, laptop computers, servers, wireless devices (e.g., mobile phones, tablets, personal digital assistants, etc.), and the like.

The user systems 102 access the cloud computing environment 106 via one or more interfaces (not shown) such as a web browser, application, etc. to utilize resources provided by the environment 104. For example, FIG. 1 shows a plurality of resources such as applications 108 and computing resources 110 available within the cloud computing environment 104. Computing resources 110 include but are not limited to, processing, storage, networking, and other fundamental computing resources. Resources 108, 110 are provided by and/or are hosted on a plurality of physical information processing systems 112, 114, 116 and/or a plurality of virtual machines 120, 122 being executed by physical systems 114, 116. A plurality of physical systems 112, 114, 116, virtual machines 120, 122, or a combination thereof grouped together for providing a resource(s) is referred to as a "cluster" 124 of virtual machines.

In one example, a cloud user (via a user system 102) utilizes the cloud environment 104 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier. Each of the web server, application server, and database server tiers can be comprised of one or more of the information processing systems 114, 116 and/or VMs 120, 122 in the cloud environment 104.

The cloud computing environment 104 further comprises one or more information processing systems 126 that comprise a provisioning manager 128. It should be noted that the information processing system 126 is not required to reside within the cloud environment 106. The provisioning manager 128 provisions resources in the cloud environment 106 to cloud users. In one embodiment, the provisioning manager 128 collects a first set of performance information for a base allocation of computing resources across multiple server tiers in the plurality of sever tiers for a set of workloads.

Figure 2:
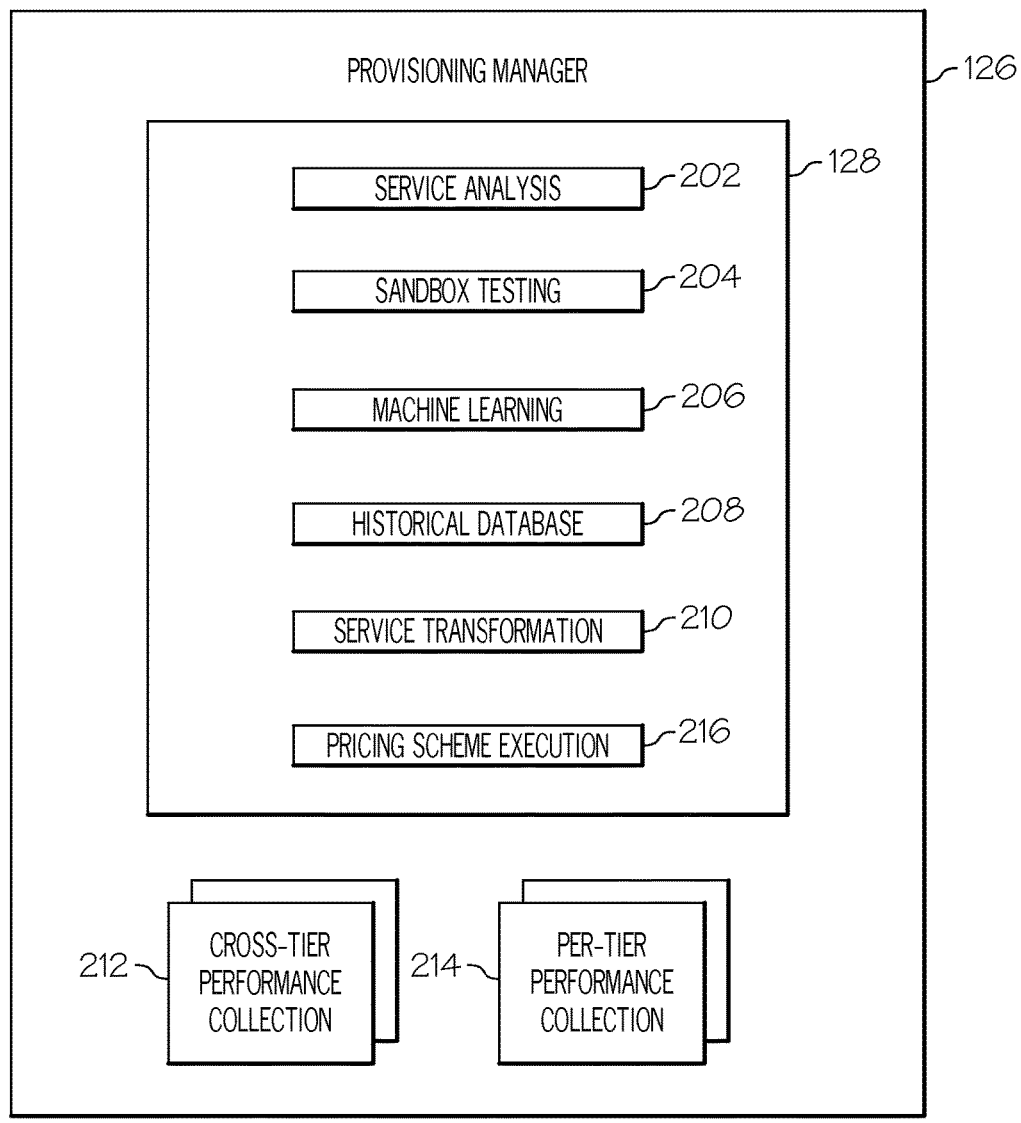
FIG. 2 is a block diagram illustrating a detailed view of a provisioning manager.

The provisioning manager 128, in one embodiment as shown in FIG. 2, comprises a services analysis module 202, a sandbox testing module 204, a learning module 206, a historical database 208, a service transformation module 210, and pricing scheme execution 216. A new service request is received by the services analysis module 202. The service analysis module provisions at least some limited testing resources to the new service request in the sandbox testing module 204. Computational resource usage data is produced by the sandbox testing module 204 during the provisioning of the new service request. The learning module 206 receives the computational resource usage data, as well as accesses historical computational resource data to create a prediction of the computational resources that will be required to fulfill the new service requests.

Further the service analysis module 202 monitors and records application workloads and the corresponding performance including resource consumption in the historical database 208. For example, the service analysis module 202 monitors and collects historical computational resource usage data cross-tier performance data collection 212 based on the collected workloads and performance data. The service analysis module 202 also monitors and collects historical computational resource usage data per-tier performance data collection 214 based on workloads and performance data. The pricing scheme execution 216 works cooperatively with the service analysis module 202 to select the candidate provisioning plan that meets the user-specified performance goal and has the lowest virtual machine instance and other resources renting cost. This selected plan is utilized as the suggest deployment for the cloud user.

Overview of Pre-Provisioning New Service Request Testing Using a Sandbox

Figure 3:
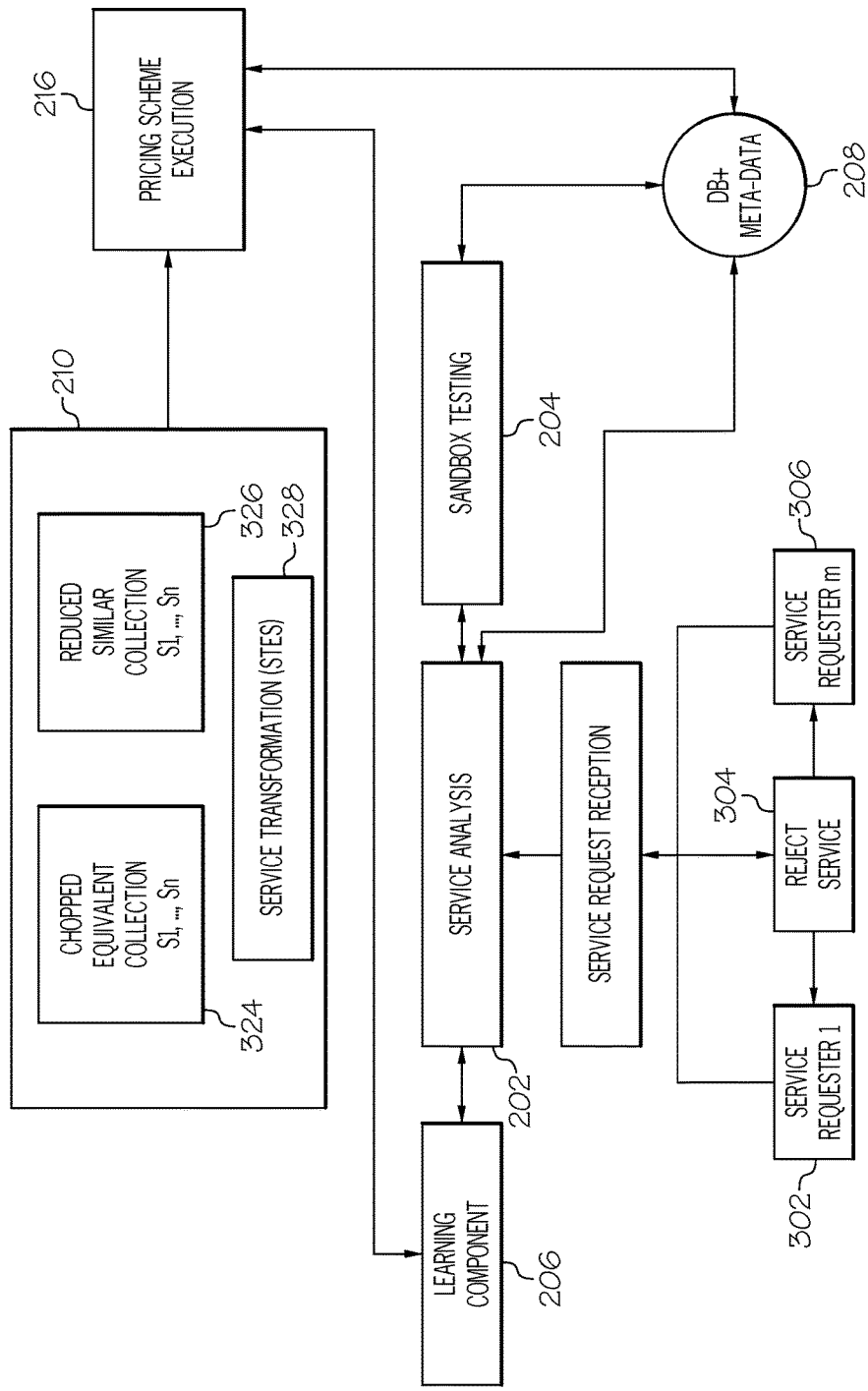
FIG. 3 is a functional block diagram illustrating a cloud-based service manager.

Turning now to FIG. 3, if the service analysis module 202 determines that the request may pose a high risk, it can apply a number of mitigating transformations by the service transformation module 210. The transformation may simplify the service request, may limit its extent, and may transform it to a collection of sub-requests. These collections come in two flavors: one that approximates the original service request, Reduced Similar Collection (RSC) 326, and one that preserves the original request, chopped equivalent collection (CEC) 324, but performs it in a number of logical stages. These transformations may be combined. When executed, the user is optionally informed about what actually has been executed. The execution is handled by the pricing scheme execution 216. This module employs pricing methods designed to encourage efficient and non-malicious usage.

The present invention provides safe processing of service requests on a cloud platform wherein problematic service requests are identified through the use of machine learning and sandbox testing. Pricing and allocation schemes are specifically designed to address such requests. This can be done through modifying the request into cheaper requests or breaking the request into a collection of sub-requests that still fulfill the original request. The service analysis module 202 can calculate how many resources a particular request would need based on machine learning achieved through analysis of historical data and statistics coupled with sandbox testing. If it is determined that the request is problematic, then a number of mitigating transformations can be applied to simplify, limit or transform the sub-requests. The request can be simplified by reduced similar collection, RSC.

Pre-Execution Testing Using a Sandbox Module

Here a few small approximate versions of the service, or models, say $M_2, \ldots, M_m$ of relative sizes $100, 1000, \ldots, 10^m$, are produced. For example, if m=4, measure=MB, then we use models whose data sizes are 100 MB, 1,000 MB, 10,000 MB. The models are produced while trying to preserve the characteristics of the data used by the service request R. Request R, perhaps with needed adjournments, is then applied to $M_2, \ldots, M_m$ and R's time, space and other resource consumption are used to predict the consumption, optionally together with historical data, of R itself.

For example, if the request is in graph analytics, the $M_i$'s may be reduced versions of the actual graph with desired properties. As another example, if the request is in genomic analysis, the $M_i$'s may be portions of the relevant genome. Or, if the request is in molecular simulation of a compound, it may be applied to similar but simpler compounds.

The system executes R on $M_2, \ldots, M_m$ and records data of usage trends in terms of time, space, processors and other relevant resources. There are a few cases to consider:

a. If there is a clear and consistent trend of consumption that shows that the consumption of R is expected to be too high, then: (1) the request may be rejected, (2) the results on $M_2, \ldots, M_m$ may be provided as an example to the requester, (3) Executing a transformed version of the request, see below.

b. Otherwise, the request is allowed to execute, subject to a pricing based execution policy and controls (see below).

c. In both of the above cases, the system will maintain a record of the form (prediction-time, prediction-space, prediction-processors, actual-time, actual-space, actual-processors, excessive) where prediction-time, prediction-processors, prediction-space are the estimates based on the $M_2, \ldots, M_m$ execution, actual-time, actual-processors, actual-space are the actual consumption on M, the actual system, and excessive is a Boolean flag where TRUE means the query did not complete execution on the system within reasonable time. This data will be used by the pricing scheme execution 216 to better correlate between model and real executions. The pricing scheme execution 216 employs neural networks (NNs), Genetic Algorithms, Support Vector Machines (SVM) and other machine learning technologies to learn the prediction function. The set of recorded resources (time, space, processors) may be extended. The system may also record whether and to what the request was transformed.

Execution with Pricing and Resource Constraints

Pricing is a simple technique for discouraging long-running resource consuming requests. In one example a monotonically increasing pricing function PF(resources) of resources, primarily time, space and processors, is associated with the execution. The PF function may be such that the rate of payment increases with usage, for example PF(t)=if t<b then c else $c+a*t^{1.5}$ where $a,b>0$, $c \geq 0$ are system parameters. The user may put a cap, C, on the overall payment s/he is ready to pay for the execution. The idea is to impose a small payment c (perhaps even c=0) on reasonable executions that take less than b milliseconds, and to substantially increase the payment for longer running queries. Pricing may take into account additional parameters such as, for example, storage consumed. And pricing may include numerous variations that have to do with commercial and business relationships. The user may be required to allocate money in advance, prior to execution. Additional payments may be required along the way as more resources are consumed, if not authorized fast enough, this may cause execution delays and additional 'setting up' fees.

The service analysis module 202 along with the service transformation module 210 and the pricing scheme execution 216 can also control resource allocation towards performing the service, namely reduce the allocated resources: processors, main memory, time slices size and frequency, as time progresses. This way, the submitters are encouraged to submit short running requests. And, malicious submitters are limited in the harm each may individually cause.

As various submitters may collude to maliciously, and separately, try to overload the system, limiting available resources should apply to the whole group of malicious submitters, viewed as a single submitter. Of course, the malicious submitters do not usually identify themselves as such a group. So, these requests are automatically grouped into groups based on the length, and perhaps other consumed resources, of execution.

One implementation is to group submitters into priority classes based on length of execution (and perhaps other parameters). For example, class A (of highest priority) of fresh requests, classes B, C and D, of requests executed over 2, 4 and 8 minutes, respectively. Class A may be allocated 50% of the resources, class B 25%, class C 15% and class D 10%. If there are currently underutilized resources at a class, they may be allocated for a system determined duration to the next priority class. In this way a request receives less resources, and has to share them with others like it, the longer it runs. However, no resources are left unused if they can be used. The numbers 50, 25, 15 and 10 may be chosen differently and even adjusted dynamically.

Another implementation decides on the resources to be allocated to a request as the request enters the system. This determination may be based on analysis performed by the service analysis module 202 based on the request characteristics and optionally using the machine learning component 206. As time progresses, the request receives a smaller percentage of its initial allocation. For example, suppose that exceeding 4 minutes reduces resources to 50% of initial allocation, and exceeding 8 minutes reduces resources further to 18% of initial allocation. This scheme may be coupled with the group allocation scheme as follows. Continuing the example, if there are 5 requests in the class of those exceeding 4 minutes and 2 in the class of those exceeding 8 minutes, then the 5 requests each gets 10% of the resources initially allocated to it (50/5), and each of the 2 requests exceeding 8 minutes gets 9% (18/2) of the resources initially allocated to it. This way, even a group of malicious submitters can cause a very limited damage as they experience fast resource degradation together. And, in addition, there is a clear policy for reducing resources to long running requests (even if not part of a malicious group).

Request Transformation

Once a decision is made to provision the new service based on the prediction created on the resource that will be required, the service transformation module 210 can break the new service request up into sub-requests. For example, the service transformation module 210 can analyze the new service request to identify an amount of computational resources, as a function of size of data, required to fulfill the new service request. In the case that the amount does no exceeding a definable threshold, the new service request is executed in the computing environment monitored by pricing scheme execution 216.

On the other hand, if the amount computational resources that are required is greater than a definable threshold, in one example the service transformation 210 takes one or more actions. A first action is the new service request is limited to a sub-set of the computational resources in the computing environment. A second action is the service transformation 210 internally dividing the new service requests into at least two or more new individual service sub-requests to implement the equivalent service request or an approximation thereof. Or a combination of the first action and the second action.

There are methods for replacing a request R by another request (or sub-requests):

Reduced Similar Collection

Request R may be simplified by using techniques to replace R by a collection of potentially simpler requests, and then, potentially recursively, simplify the collection further. Observe that the execution of these "new" sub-requests may not always be equivalent to the original request.

Choose a subset of the sub-services prescribed by R. For example, if R requests a collection of statistics, perform only some of them. Generally, given a collection $R_1, \ldots, R_w$ of sub-services, randomly choose a subset of cardinality c, a parameter, to actually execute. If these sub-services depend on each other then the choice should respect this dependency.

Simplify the service. For example, instead of an expert level language to language machine translation, perform a competent-level translation (weaker than expert). For another example, turn a complex querying request into a simpler one that approximates the original request.

To implement this reduced similar collection, the service transformation module 210, can analyze the new service request to determine if the new service request is divisible into a set of two or more new individual service sub-requests to implement a service request with lower accuracy. In the event that the new service request being divisible, internally dividing the new service request into at least two or more new individual service sub-requests to implement the service request with lower accuracy. The two or more individual service sub-requests in other example are used to set an estimated price for the new request service via the pricing scheme execution 216.

Chopped Equivalent Collection.

Here a large request is considered that may be broken into stages. For example, consider a large query Q. Replace Q by $Q_1, \ldots, Q_k$ such that their step-wise execution produces Q's result. The chopped equivalent collection technique produces partial computations that may be extended to a full correct result. The partial computations may present opportunities for a business model in which the user can decide piecemeal which sub-request query in the collection to execute and may be charged differently for different sub-request queries (so, in this case chopped equivalent collection is coupled with pricing). It also enables a business model in which each subsequent Qi in the collection is executed separately, with a decreasing system priority level (presumably to allow other queries to execute). This method can effectively mitigate a denial of service attack expressed by an extremely costly request.

To implement this chopped equivalent collection technique, the service transformation module 210, can analyze the new service request to determine if the new service request is divisible into a set of two or more new individual service sub-requests to implement an equivalent service request. In the event that the new service request being divisible, internally dividing the new service requests into at least two or more new individual service sub-requests to implement the equivalent service request. The two or more individual service sub-requests in other example are used to set an estimated price for the new request service via the pricing scheme execution 216.

Mixed. One Can Intermix the Reduced Similar Collection and Chopped Equivalent Collection Techniques Using Knowledge About the New Service Request A The service request A may be improved by knowledge about the internals of the service. For example, executing an expensive request can be avoided if it can be determined that the performance of the request will fail. For example, performing a graph analytic task (e.g., finding a pattern) where knowledge about the properties of the graph can be used to deduce that the pattern will not be found. As another example, knowing that the accuracy of a set of data is limited to 2 decimal positions precludes performing a service request that is accurate to at least 3 decimal positions.

Operating a Cloud-Based Graph Querying System

A Graph Query System is an example system that has distinct characteristics and options. When operating a query system on cloud shared resources, certain queries may be problematic in terms of the resources they require. For example, a submitted query may run for a long time or produce many results and slow down the system as a whole. In this example graph databases (GDBs) are used with a newly spreading form for data storage, especially in the social arena.

For relational databases (RDBs) queried with SQL, one can obtain a total run-time estimate by the query optimizer. In principle, such could also be the case for graph databases. However, given the lack of a standard agreed upon single query language as well as the relatively early stage of graph database systems, there is currently no straightforward way to obtain estimates. Note that time is not the only resource of interest. Space for storing intermediate results is also an important parameter as are the number of processors required (in a multi-core or GPU-based systems). There may be other restrictions. What distinguishes queries from other computational tasks is that various methods of limiting risk to queries can be applied that are usually not easily applicable to general purpose systems and services. Practically, there are a few main reasons why this problem deserves attention:

Expected resource usage may dictate the amount of resources to be allocated to the task. This is especially important in a cloud-based environment where additional resources may be dynamically allocated to the task. This is also important in a multi-processor environment in which running out of time may put the job at the back of the queue for a long period of time often waiting for sufficiently many processors to become available.

Very long running queries may be used to overload a system by maliciously denying service to others. As problems encoded as graph queries may be of high complexity, these queries deserve special attention.

Many graph queries are exploratory. That is, they carve out components of the graph of interest for further analysis. If a complex exploratory query can be replaced by one that is less complex but still allows a useful second stage analysis, the identification (and replacement) of complex queries may be a useful technique.

Figure 4:
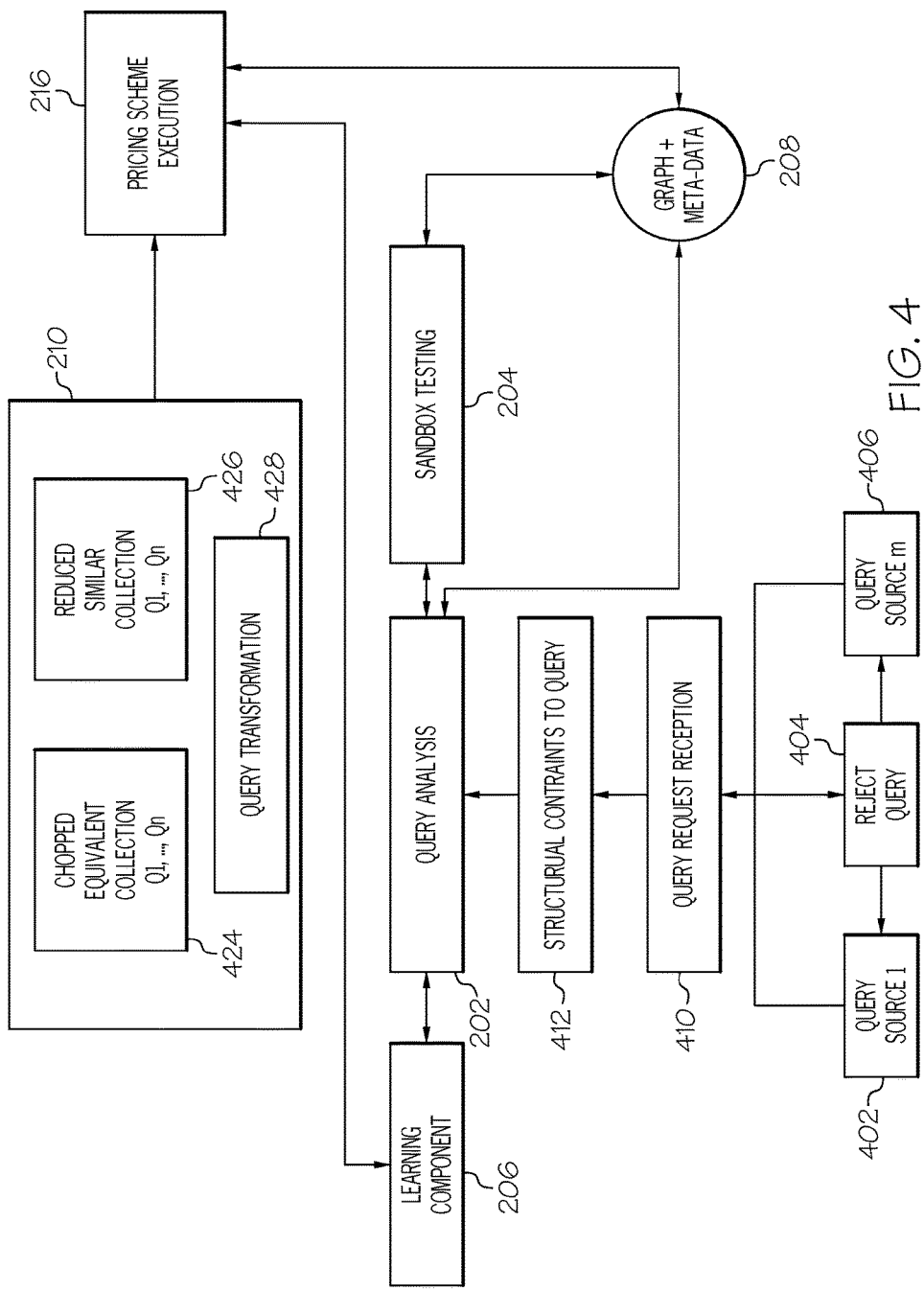
FIG. 4 is a functional block diagram illustrating a cloud-based query service manager.

Turning now to FIG. 4 which consists of a number of main modules. There are a number of query requester sources 402, 406. A query Q is received by a query request reception module (QRRM) 410. The QRRM determines whether to admit the query to the system. The decision is based on an analysis of the query that is performed by the query analysis module (QA) 402. The QA module 402 may use the machine learning component 206 that can predict, based on historical data, sandbox testing and statistics, the likely resource consumption by Q. QA module 402 may use graph meta-data, including predicates satisfied by the graph. The QA module 402 may test the query in a sandbox module 204 that has a reduced version of the actual graph. If QA module 402 determines that the query may pose a high risk, it can apply a number of mitigating transformations by the query transformation (QT) module 428. The transformation may simplify the query, may limit its expressiveness, and may transform it to a collection of queries. These collection come in two flavors: one that approximates the original query, reduced similar collection (RSC) 426, and one that preserves the original query, chopped equivalent collection (CEC) 424, but performs it in a number of logical stages. These transformations may be combined. When executed, the user is informed about what actually has been executed. The execution is handled by the pricing scheme execution 216. This module employs pricing methods designed to encourage efficient and non-malicious usage.

The first query language we consider is graph matching (GM). A query is simply a graph (directed or undirected, depending on whether the queried graph is directed or undirected). Let us begin with undirected graph G=(V,E), V={v1, ..., vn}, the set of edges E is a set of pairs {a,b} where both a and b are taken from V, a=b is possible. So, a query is a graph Q=(U,E1), U={u1, ..., uk} and E1 is a set of pairs {u,v} where both u and v are taken from U, u=v is possible. A subset U1 of cardinality C of U is marked as target nodes (may be any proper subset, empty or equal to U). The semantics is that each U node must match a distinct V node and each edge in the query graph Q must exist between the images of the Q nodes in the queried graph G. Observe that the result cardinality is bounded by $n^C$. Another reasonable semantics is that distinct Q nodes may map to the same data node (for ease of exposition the first semantics is followed). For directed graphs and queries, the definition is identical except that pairs {a,b} become pairs (a,b), namely an edge directed from node a to node b.

There is also an upper-bound on the time that Q may consume implied by a simple evaluation strategy. In the worst case, examine $n^k$ node tuples and check each tuple for the required edge constraints. So, the worst case time complexity is $O(n^{(k+1)})$ graph operations (such as node or edge look-up). Here, k is the number of nodes in Q which can be O(n). So, the worst time complexity of this simple evaluation strategy may be exponential in n. In fact, one can easily pose queries expressing NP-complete problems on graphs, for example the CLIQUE problem is simply represented as a query Q that is a k-clique, with no target nodes (i.e., a Boolean query).

The next language considered is graph matching with paths (GMP). Here, some of the edges in the query are marked as path-edges rather than ordinary edges as in GM. The semantics is that a path-edge connecting u and v in Q stands for a path in the data graph G. In this example, with undirected graphs, we require that distinct Q nodes be mapped to distinct G nodes. Now, there are a few reasonable semantics for path-edges. In this example, only simple paths are considered in the following:
 1. The path between the images u and v s.t. {u,v} is an edge in Q may pass through any node of G other than u and v (the endpoints).
 2. An image path cannot pass through nodes, other than once at u and v—its endpoints, that are images of nodes in Q.
 3. 1a and 2a, further to 1 and 2, image paths of distinct path-edges are not allowed to intersect in G unless the intersection is due to a common end-point.

The complexity of GMP queries is now considered. For semantics 1, instead of checking for the existence of an edge, a check is made for the existence of a path. For each of the $O(n^k)$ mappings of query nodes to graph nodes we use a depth-first-search (DFS) to determine path existence which is $O(|V|+|E|)=O(n^2)$. So, the overall cost is $O(n^{(k+3)})$. For semantics 2, we use the same method with the distinction that before performing a DFS we temporarily delete from the graph those nodes that are images of query nodes that are not the endpoints of the checked path-edge.

Semantics 1a and 2a are more complex to evaluate as the paths in G cannot intersect. The semantics essentially 'expresses' an NP-complete problem, ND40, from *Computers and Intractability: A Guide to the Theory of NP-Completeness* Authors: Michael R. Garey David S. Johnson Publication: Book Computers and Intractability: A Guide to the Theory of NP-Completeness W.H. Freeman & Co. New York, N.Y., USA ©1979 ISBN:0716710447, which is hereby incorporated by reference in its entirety, an instance of problem ND40 can be reduced to an instance of querying the graph with an appropriate query Q.

Note that the complexity of ND40 is open for any fixed k>2 (k there is the number of disjoint paths). So, under semantics 1a and 2a, even queries restricted to having 3 path edges are potentially very costly.

Using Knowledge about the Graph

Module 410 and QRRM 412 described above in one example are used to carry out this section of Using Knowledge about the Graph. A query may be potentially costly over arbitrary graphs but reasonable over restricted classes of graphs. Consider for example GM query Q. Suppose G is known to be a tree. Then, any query Q displaying a cycle trivially returns an empty result set of tuples. In this special case all GM as well as all GMP queries can be solved efficiently (by, for example, using TwigStack Nicolas Bruno, Nick Koudas, Divesh Srivastava: Holistic twig joins: optimal XML pattern matching. SIGMOD Conference 2002: 310-321, which is hereby incorporated by reference in its entirety.

Other useful predicates may include:
 1. A bound on the maximal simple path length in the graph, m. This bounds the number of simple paths that need be examined to $n^m$.
 2. A bound on the length of a simple cycle in the graph, m.
 3. A bound of the degree of a node in the graph, m, and for directed graphs in-degree, out-degree, $m_1$ and $m_2$.
 4. Planarity of the graph (Q with no path-edges must be planar to have a non-empty result set, Q with path-edges deleted must be planar).
 5. Any property P which can be checked in a low polynomial time and which if a graph has it so does any satisfiable query graph. For example, P="all simple cycles are of even length" (recall undirected G is a bipartite graph if and only if each cycle of G has even length.)

Given a set of such predicates PRED={P1, ..., Pm}, that Q must satisfy, once Q is posed, first check if Q satisfies PRED (perhaps with path-edges deleted). If the answer is negative Q will have an empty result set. If the answer is positive, Q needs to be pre-execution sandbox-tested only on graphs satisfying $P_1, \ldots, P_m$ which implies that the sandbox generation methods need to check that the sandbox version satisfies $P_1, \ldots, P_m$.

In some cases a predicate Pi may be represented via a forbidden pattern, itself a query, namely queries that are to return no result tuples. In that case, the forbidden pattern query is executed against the query Q (viewed as a data graph, again with path edges deleted) and if the result is non-empty then the result of Q on the data graph will be empty. As an example, the predicate that "all cycles up to length k (an even number) are of odd length" may be expressed by a sequence of forbidden cycle queries of even lengths: 2, 4, 6, . . . , k'.

Similarly, a predicate such as "all simple path lengths through 'a' labeled nodes are bound by 10" may be used to transform queries with path edges that constrained to traverse through only 'a' labeled nodes to a collection of queries containing explicit paths of up to length 10 through 'a' labeled nodes. Each of these new queries may be tested for forbidden patterns and eliminated if such a pattern occurs.

Handling Cost Uncertainty

The following is an outline of operational methods for handling cost uncertainty Method of Pre-Provisioning New Query Request Testing Using a Sandbox Here a few small approximate versions, or models, of the graph G, say $G_2, \ldots, G_m$ of relative sizes 100, 1000, . . . , $10^m$, respectively, are produced where $G_2$ has a 100 nodes. The models are produced while trying to preserve the characteristics of G. Query Q is then applied to $G_2, \ldots, G_m$ and Q's time and space resource consumption is used to predict the consumption over G.

The value of m depends on the size of the graph G, a reasonable choice for m is such that $10^{(m+5)}$ is roughly G's size. Five optional procedures for constructing the Gi graph are now presented (others are possible). To illustrate them, in this example suppose the number of nodes in G is $10^9$. Then m=4 and $G_m$ should have 10,000 nodes. If query Q mentions specific G nodes, say s, t and others, these nodes and edges between them are first added to the initially empty Gm. Possible procedures include:

1. Random: Suppose: Randomly choose 10,000 nodes out of G to be the nodes of $G_m$. Then, repeat the following $1/100,000$, of G's number of edges, times. Randomly choose 2 nodes u and v in $G_m$. Connect u and v via an edge. $G_{m-1}$ is constructed from $G_m$ in a similar way. Observe that the edges of G do not affect the structure of $G_m$. (Except those between specific graph nodes that are mentioned explicitly in the query.)
2. Path-based: Randomly choose 10,000 nodes out of G to be the nodes of $G_m$. Then, repeat the following until $1/100,000$ of G's number of edges are obtained. Randomly choose 2 nodes u and v in $G_m$. If the distance in G between u and v is less than 100, connect u and v via an edge in $G_m$. $G_{m-1}$ is constructed from $G_m$ in a similar way. Observe that the edges of G affect the structure of $G_m$.
3. Neighborhood-based: Randomly choose a node u in G and add it to G'. Perform a BFS from u in G. Add the explored nodes to G' and all edges between explored nodes. Stop once 10,000 nodes have been added. $G_{m-1}$ is constructed from $G_m$ in a similar way.
4. Clique-based: By repeatedly choosing size 3 cliques and "merging their nodes" (if no size 3 cliques remain, use size 2 cliques).
5. Combined: Form $G_m$ by operating j procedures concurrently, each one stops after approximately adding 1/j of the nodes and edges required to form $G_m$.

The system's query processor executes Q on $G_2, \ldots, G_m$ and records usage in terms of time, space, processors and other relevant resources. There are a few cases to consider:

a. If there is a clear and consistent trend of consumption that shows that the consumption on G is expected to be too high, then: (1) the query may be rejected, (2) the results on $G_2, \ldots, G_m$ may be provided, (3) executing a transformed version of the query, see below.

b. Otherwise, the query is allowed to execute, subject to a pricing based execution policy.
c. In both of the above cases, the system will maintain a record of the form (prediction-time, prediction-space, prediction-processors, actual-time, actual-space, actual-processors, excessive) where prediction-time, prediction-processors, prediction-space are the estimates based on the $G_2, \ldots, G_m$ execution, actual-time, actual-processors, actual-space are the actual consumption on G and excessive is a Boolean flag where TRUE means the query did not complete execution on the system within reasonable time. This data will be used by the Learning Module (LC) to better correlate between model and real executions. The machine learning component 206 employs neural networks (NNs) and other machine learning technologies to learn the prediction function. The set of recorded resources (time, space, processors) may be extended.

Query Transformation

There are methods for replacing Q by other query (or queries):

1. Reduced Similar Collection.

Query Q may be simplified by using the following techniques to replace Q by a collection of simpler queries, and then, potentially recursively, simplify the collection further:

Choose a path edge and replace it with paths (using new nodes) of length 1, . . . , w where w is a system parameter; each such replacement produces a distinct version of Q: $Q_1, \ldots, Q_w$, Note that any result returned by one of the Qi's would have been returned by the original query Q. The technique is faithful, that is Q' subset Q, by this we mean that for any graph, the results of Q' are contained within the results of Q.

Restrict the number of edges not to exceed a system parameter C. The number may be restricted by repeatedly randomly eliminating a query edge e. This technique is not faithful. However, any result returned by the original query Q will also be returned by the modified query Q'. This technique is said to be covering, which means Q subset Q'. Observe that deleting edges will generally result in larger result sets of tuples as less constraints apply to a returned result tuple (namely, the existence of an edge). The user may query the system regarding the existence of such edges. If there is a user cost associated with such querying, either financially or time-wise, the user may be satisfied with an approximate result.

Restrict the number of nodes not to exceed a system parameter D. The number may be restricted by repeatedly randomly eliminating a query node u. Deleting a node u is accompanied by deleting all its associated edges.

In this example assume that the original query Q is connected. If the resulting Q' after deleting u is disconnected, there are a number of options in terms of Q connectivity preservation, for example:

Allow the resulting query to have disconnected portions. This technique is covering but not faithful as some results may not be results of Q.

Let v be connected in Q to nodes x1, . . . , xn. Form a k-clique over these nodes. This technique is not covering as some Q results will not be returned and it is not faithful as some Q' results may not be results of Q.

Given a collection $Q_1, \ldots, Q_w$ of queries, randomly choose a subset of cardinality c, a parameter, to actually execute. This technique preserves the faithfulness and covering properties of the individual Qi's.

2. Chopped Equivalent Collection.

Consider undirected graphs and queries. Replace Q by $Q_1, \ldots, Q_k$ such that their step-wise execution produces Q's result. This transformation preserves faithfulness. The formation of $Q_1, \ldots, Q_k$ may be performed by first partitioning Q into bi-connected modules. Each bi-connected module forms a new query Qi. If some Qi is "too large", Qi may be partitioned by isolating a smaller connected sub-module of it and forming a new Qi. Observe that these Qi's will need their own target nodes. These target nodes will consist of Q's target nodes as well as articulation nodes, and generally, nodes connected via an edge in Q that are in separate Qi's. This ensures that joining their results and projecting on Q's target nodes will produce Q's result.

Consider directed graphs and queries. Here $Q_1, \ldots, Q_k$ are based on the strongly connected modules of Q. The strongly connected modules (viewed as nodes) form a DAG and the order of execution may be any topological sort of this DAG.

The execution can evaluate the Qi's in any order and then join their target node relations. This may be inefficient and the join is better (a) performed incrementally, and (b) project the current join result on nodes (i.e., columns) that appear in the next Qi to execute so as to obtain starting data nodes ("anchors") for the evaluation.

The Chopped equivalent collection technique produces results of partial computations that may be extended to a full correct result. The partial computations may present opportunities for a business model in which the user can decide piecemeal which query in the collection to execute and may be charged differently for different queries (so, in this case chopped equivalent collection is coupled with pricing). It also enables a business model in which each subsequent Qi in the collection is executed separately, with a decreasing system priority level (presumably to allow other queries to execute). This method can effectively mitigate a denial of service attack expressed by an extremely costly query.

3. Mixed. One Can Intermix the Techniques Described Above.

Generalized Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Figure 5:
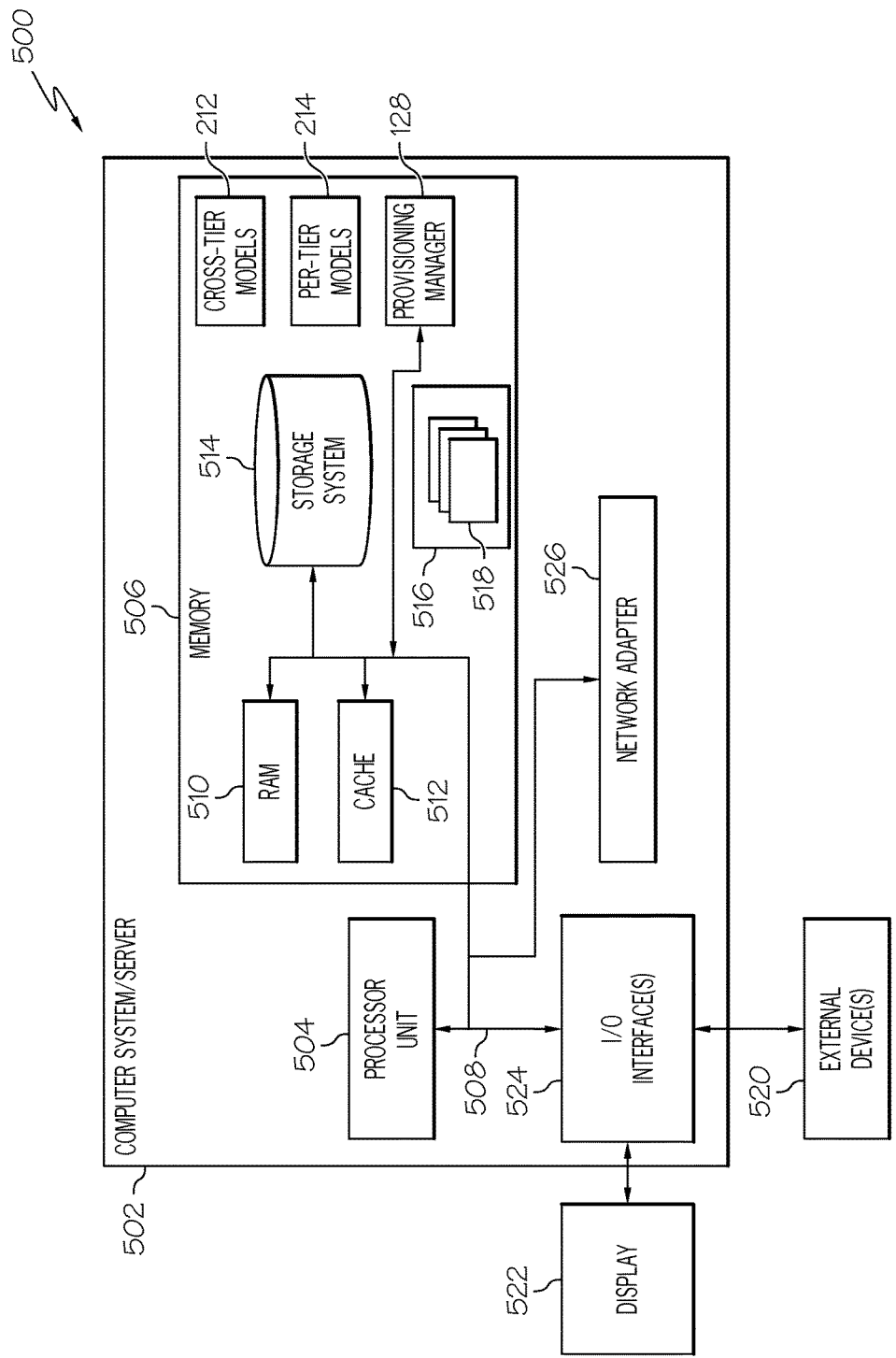
FIG. 5 illustrates one example of a cloud computing node according to one embodiment of the present invention.

Referring now to FIG. 5, a schematic of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

Referring now to FIG. 5, a schematic of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processor units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 518, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein. Computer system/server 502 may also communicate with one or more external devices 14 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 22. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, GPUs, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving at least one new service request for computational resources in a computing system, wherein required computational resources include memory usage, storage usage, processor usage, or a combination thereof to fulfill the new service request;
   operating the new service request in a sandbox computing environment, the sandbox computing environment is used to execute a new service requests without harming the computing system by restricting access to the computer system and network, the sandbox computing environment performing pre-execution testing by two or more approximate versions of services models for the new service request, where each service model uses different data sizes, and executing the new service request on each of the two or more approximate versions of services models in the sandbox computing environment to record predicted computation resources usage data including predicted execution time required, predicted memory space required, and predicted number of processors required;
   machine learning module utilizing both the predicted computational resources usage data and historical computational resources usage data to create a prediction of the computational resources that will be required in the computing system to fulfill the new service request;
   based on the predicted computational resources required being above a definable quality of service threshold, performing at least one of
      rejecting the new service request,
      providing the predicted computational resources based on each of the service models to a requestor of the new service, and
      transforming the new service request into sub-requests, where each sub-request is limited to a sub-set of computational resources, or
      a combination thereof; and
   based on the predicted computational resources required being below the definable quality of service threshold, deploying in the computing system which is separate from the sandbox computing environment, the computational resources which have been predicted based upon the new service request subject to pricing policies and resource constraints, and recording actual computation resources usage data as historical computation resources usage data including actual execution time required, actual memory space required, and actual number of processors required.

2. The method of claim 1, further comprising:
   analyzing the new service request to identify an amount computational resources, as a function of size of data, required to fulfill the new service request; and
   based on the prediction from the machine learning module and in response to the amount being greater than a definable threshold,
      (a) limiting the new service request to at least a sub-set of the computational resources in the computing system;
      (b) internally dividing the new service requests into at least two or more new individual service sub-requests to implement an equivalent service request; or
      a combination of a and b; and
   based on the prediction from the machine learning module and in response to the amount not exceeding a definable threshold, executing the new service request in the computing system.

3. The method of claim 2, further comprising:
   executing the new service request; and
   determining an excess amount of computational resources being consumed for the new service request; and based on the excess amount of computational resource consumed to limit the computational resources made available for the new service request.

4. The method of claim 1, further comprising:
   sending an estimate for the new service request or a rejection for the new service request to a requestor of the new service request; and
   receiving authorization from the requestor whether to continue executing the new service requests or stop executing the new service request.

5. The method of claim 1, further comprising:
   using the prediction of the computational resources required in the computing system to implement the new service request to set an estimated price for the new service.

6. The method of claim 1, further comprising:
   fulfilling the new service request by
      analyzing the new service request to determine if the new service request is divisible into a set of two or more new individual service sub-requests to implement an equivalent service request; and
      in response to the new service request being divisible, internally dividing the new service requests into at least two or more new individual service sub-requests to implement the equivalent service request.

7. The method of claim 6, further comprising:
   using the two or more new individual service sub-requests to set an estimated price for the new service request.

8. The method of claim 7, further comprising:
   placing the new service request into a user class depending on the prediction of the computational resources that will be required in the computing system to fulfill the new service request; and
   using the user class to limit the computational resources made available for the new service.

9. The method of claim 6, further comprising:
sending a result of an individual service sub-request to a requestor of the new service; and
receiving authorization from the requestor whether to continue executing the sub-requests or stop executing the new service request.

10. The method of claim 6, wherein the new service request includes a query and the set of two or more new individual service sub-requests are partial queries.

11. The method of claim 1, further comprising:
implementing the new service request by
analyzing the new service request to determine if the new service request is divisible into a set of two or more new individual service sub-requests to implement the new service request with lower accuracy; and
in response to the new service request being divisible, breaking the new service request into at least two or more new individual service sub-requests to implement the new service request with lower accuracy.

12. The method of claim 11, further comprising:
using the two or more new individual service sub-requests to set a price for the new service.

13. The method of claim 1, wherein the new service request is transferred to at least one lower class with fewer resources after excess resource consumption is detected.

14. The method of claim 1, wherein an amount of overall resources allowed for the new service request is adjusted, once or more, to a percentage of its original resource estimate once an excess consumption is detected.

15. A system for managing new service requests, the system comprising:
a memory;
a processor communicatively coupled to the memory, where the processor is configured to perform
receiving at least one new service request for computational resources in a computing system, wherein required computational resources include memory usage, storage usage, processor usage, or a combination thereof to fulfill the new service request;
operating the new service request in a sandbox computing environment, the sandbox computing environment is used to execute a new service requests without harming the computing system by restricting access to the computer system and network, the sandbox computing environment performing pre-execution testing by two or more approximate versions of services models for the new service request, where each service model uses different data sizes, and executing the new service request on each of the two or more approximate versions of services models in the sandbox computing environment to record predicted computation resources usage data including predicted execution time required, predicted memory space required, and predicted number of processors required;
machine learning module utilizing both the predicted computational resources usage data and historical computational resources usage data to create a prediction of the computational resources that will be required in the computing system to fulfill the new service request;
based on the predicted computational resources required being above a definable quality of service threshold, performing at least one of
rejecting the new service request,
providing the predicted computational resources based on each of the service models to a requestor of the new service, and
transforming the new service request into sub-requests, where each sub-request is limited to a sub-set of computational resources, or
a combination thereof; and
based on the predicted computational resources required being below the definable quality of service threshold, deploying in the computing system which is separate from the sandbox computing environment, the computational resources which have been predicted based upon the new service request subject to pricing policies and resource constraints, and recording actual computation resources usage data as historical computation resources usage data including actual execution time required, actual memory space required, and actual number of processors required.

16. The system of claim 15, further comprising:
analyzing the new service request to identify an amount computational resources, as a function of size of data, required to fulfill the new service request; and
based on the prediction from the machine learning module and in response to the amount being greater than a definable threshold,
(a) limiting the new service request to a sub-set of the computational resources in the computing system;
(b) internally dividing the new service requests into at least two or more new individual service sub-requests to implement an equivalent service request; or
a combination of a and b; and
based on the prediction from the machine learning module and in response to the amount not exceeding a definable threshold, executing the new service request in the computing system.

17. The system of claim 16, further comprising:
sending an estimate for the new service request or a rejection for the new service request to a requestor of the new service request; and
receiving authorization from the requestor whether to continue executing the new individual service sub-requests or stop executing the new service request.

18. The system of claim 15, further comprising:
using the prediction of the computational resources required in the computing system to implement the new service request to set an estimated price for the new service.

19. The system of claim 15, further comprising:
fulfilling the new service request by
analyzing the new service request to determine if the new service request is divisible into a set of two or more new individual service sub-requests to implement an equivalent service request; and
in response to the new service request being divisible, internally dividing the new service request into at least two or more new individual service sub-requests to implement the equivalent service request.

20. A non-transitory computer program product for managing new service requests, the computer program product comprising a computer readable storage medium having computer readable program code embodied therewith, the computer readable program code configured to:
receiving at least one new service request for computational resources in a computing system, wherein required computational resources include memory usage, storage usage, processor usage, or a combination thereof to fulfill the new service request;
operating the new service request in a sandbox computing environment, the sandbox computing environment is used to execute a new service requests without harming the computing system by restricting access to the computer system and network, the sandbox computing environment performing pre-execution testing by two or more approximate versions of services models for the new service request, where each service model uses different data sizes, and executing the new service request on each of the two or more approximate versions of services models in the sandbox computing environment to record predicted computation resources usage data including predicted execution time required, predicted memory space required, and predicted number of processors required;

machine learning module utilizing both the predicted computational resources usage data and historical computational resources usage data to create a prediction of the computational resources that will be required in the computing system to fulfill the new service request;

based on the predicted computational resources required being above a definable quality of service threshold, performing at least one of rejecting the new service request, providing the predicted computational resources based on each of the service models to a requestor of the new service, and transforming the new service request into sub-requests, where each sub-request is limited to a sub-set of computational resources, or a combination thereof; and based on the predicted computational resources required being below the definable quality of service threshold, deploying in the computing system which is separate from the sandbox computing environment, the computational resources which have been predicted based upon the new service request subject to pricing policies and resource constraints, and recording actual computation resources usage data as historical computation resources usage data including actual execution time required, actual memory space required, and actual number of processors required.

* * * * *